(12) United States Patent
Fromm (10) Patent No.: US 7,684,694 B2
(45) Date of Patent: Mar. 23, 2010

(54) APPARATUS FOR SUPPORTING A CAMERA AND METHOD FOR USING THE APPARATUS

(76) Inventor: Wayne G. Fromm, 240 Forest Hill Road, Toronto, Ontario (CA) M5P 2N5

( * ) Notice: Subject to any disclaimer, the term of this patent is extended or adjusted under 35 U.S.C. 154(b) by 479 days.

(21) Appl. No.: 11/593,806

(22) Filed: Nov. 7, 2006

(65) Prior Publication Data
US 2007/0053680 A1 Mar. 8, 2007

Related U.S. Application Data

(63) Continuation-in-part of application No. 11/227,652, filed on Sep. 15, 2005, now abandoned, and a continuation-in-part of application No. 11/125,693, filed on May 10, 2005, now abandoned.

(30) Foreign Application Priority Data

May 8, 2006 (EP) .................................. 06009443

(51) Int. Cl.
*G03B 13/02* (2006.01)
(52) U.S. Cl. ....................................... 396/376; 396/420
(58) Field of Classification Search ................. 396/420, 396/425, 419, 423, 376; 348/4, 158
See application file for complete search history.

(56) References Cited

U.S. PATENT DOCUMENTS

| | | | | |
|---|---|---|---|---|
| 1,879,949 | A * | 9/1932 | Pinkosh | ...................... 396/376 |
| 3,004,474 | A * | 10/1961 | Hund | .......................... 359/840 |
| 3,549,113 | A | 12/1970 | Pagliuso | |
| 3,751,652 | A | 8/1973 | Peterson et al. | |
| 3,908,945 | A | 9/1975 | Shapiro et al. | |
| 4,016,583 | A | 4/1977 | Yeates | |
| 4,437,753 | A | 3/1984 | Dunn | |
| 4,439,032 | A | 3/1984 | Congdon | |
| 4,490,029 | A | 12/1984 | Tanaka et al. | |
| 4,525,052 | A * | 6/1985 | Kosugi et al. | ................ 396/419 |
| 4,530,580 | A | 7/1985 | Ueda et al. | |
| 4,545,660 | A | 10/1985 | Rudolf | |
| 4,560,261 | A | 12/1985 | Ueda et al. | |

(Continued)

FOREIGN PATENT DOCUMENTS

DE 856 361 9/1952

(Continued)

OTHER PUBLICATIONS

7 pages downloaded from the Internet showing the Minolta Disc-7 camera and camera kit produced from 1984-5.

*Primary Examiner*—Christopher E Mahoney
*Assistant Examiner*—Linda B Smith
(74) *Attorney, Agent, or Firm*—John C. Thompson; Sandra J. Thompson (57) ABSTRACT

A camera support assembly including an elongated support, such as a extensible support, which support extends between a base assembly and a handgrip, whereby a user of the camera may secure a camera to the base assembly and, while holding the handgrip, position the camera a distance away, which may be greater than arms length, to capture a still or moving image of the user, of an obstructed scene, or of hard to reach and/or unsafe areas.

1 Claim, 8 Drawing Sheets

U.S. PATENT DOCUMENTS

| | | | |
|---|---|---|---|
| 4,575,206 A | 3/1986 | Maeda et al. | |
| 4,648,698 A | 3/1987 | Iwasaki | |
| 4,929,973 A | 5/1990 | Nakatani | |
| 5,222,826 A | 6/1993 | Hanke | |
| 5,333,023 A | 7/1994 | Oxford | |
| D349,717 S | 8/1994 | Akaike et al. | |
| D349,914 S | 8/1994 | Usui | |
| D350,970 S | 9/1994 | Usui | |
| 5,429,332 A * | 7/1995 | Ishikawa | 248/187.1 |
| 5,510,863 A | 4/1996 | Kliewer | |
| 5,585,849 A * | 12/1996 | Robalino | 348/376 |
| 5,708,890 A | 1/1998 | Nakano | |
| 5,742,859 A | 4/1998 | Acker | |
| 5,768,645 A | 6/1998 | Kessler | |
| 5,959,593 A | 9/1999 | Hoshi | |
| 6,007,259 A | 12/1999 | Mori et al. | |
| 6,155,108 A * | 12/2000 | Lunn | 73/114.79 |
| 6,158,089 A | 12/2000 | Monahan et al. | |
| 6,196,504 B1 | 3/2001 | Lemke | |
| 6,211,903 B1 * | 4/2001 | Bullister | 348/14.16 |
| 6,234,690 B1 | 5/2001 | Lemieux | |
| 6,254,044 B1 | 7/2001 | Lee | |
| 6,349,905 B1 | 2/2002 | Mills | |
| 6,384,863 B1 * | 5/2002 | Bronson | 348/373 |
| 6,435,048 B1 * | 8/2002 | Zimmerman | 74/89.35 |
| 6,530,702 B2 | 3/2003 | Harris | |
| 6,769,378 B1 | 8/2004 | Dang | |
| 6,923,542 B2 | 8/2005 | Harris | |
| 7,001,049 B2 | 2/2006 | Lee | |
| 7,048,453 B1 | 5/2006 | Gaunt | |
| 7,225,694 B2 * | 6/2007 | Said | 74/89.35 |
| 2002/0097323 A1 * | 7/2002 | Ito | 348/207 |
| 2003/0234327 A1 | 12/2003 | Nakatani | |
| 2004/0263635 A1 * | 12/2004 | Katagiri et al. | 348/208.15 |
| 2005/0061933 A1 | 3/2005 | Barth | |
| 2007/0177866 A1 * | 8/2007 | Fujimoto | 396/376 |

FOREIGN PATENT DOCUMENTS

| | | |
|---|---|---|
| EP | 1 445 530 A2 | 8/2004 |
| WO | WO 94/01254 | 1/1994 |

\* cited by examiner

APPARATUS FOR SUPPORTING A CAMERA AND METHOD FOR USING THE APPARATUS

CROSS-REFERENCE TO RELATED APPLICATIONS

This application is a continuation-in-part of U.S. application Ser. Nos. 11/125,693 and 11/227,652, filed May 10, 2005 and Sep. 15, 2005, respectively, now abandoned, and also claims priority from European patent application Ser. No. 06 009 443.0 filed May 8, 2006.

TECHNICAL FIELD

The present invention relates generally to camera supports and methods of using, and more particularly to an assembly including an elongated support, which is preferably an extensible support, such as a telescoping support, which support extends between a base assembly and a handgrip, whereby a user of the camera may secure a camera to the base assembly and, after setting the self-timer on the camera or by using a remote control, position the camera a distance away while holding the handgrip, which distance may be greater than arms length, to capture a still or moving image of the user, or to capture an event blocked by a crowd or the like, or to explore hard-to-reach or unsafe areas, or to use underwater, or to be used by people confined to wheelchairs or the like.

BACKGROUND OF THE INVENTION

Frequently a person with a camera wants to be included in a photograph. The person who is using a camera with a self-timer function may position the camera on a stationary surface, set the self-timer to take a picture in a few seconds, and then run to the position where he or she wants to be when the picture is snapped. Typically, the camera is mounted on a tripod when the self-timer function of the camera is being used. Self-timer functions typically require a secure foundation to support the camera and/or the need to set up a tripod. A prior art table top tripod suitable for this purpose is shown in U.S. Pat. No. 6,254,044. Another tripod is the Hakuba Mono-stand 10, which may be used as a table top tripod and also as a monopod.

While these prior art tripods are suitable for their intended purposed, it is sometimes difficult to use such tripods. For example, on a beach secure foundations are not readily available. Strangers can be asked to photograph an individual or group, but they may not know how to operate the camera, or may operate it poorly. Alternatively, they may run off and steal the camera. The stranger may damage the camera with hands contaminated with sand, sea salt, and/or suntan lotion.

Occasionally, a person may hold the camera in front of his or her face with an extended arm and try to snap his or her picture. However, this is uncomfortable and may cause distortion due to the body position and camera angle. Also, when the camera is held this way, the camera lens angle may not be sufficiently wide to include the camera user and anything else that he or she would like to be included in the picture.

In about 1984 Minolta introduced the Disc-7 camera which was sometimes sold as a kit, the kit including an accessory small telescoping arm. The camera included a self-timer, a self-posing convex mirror, and a tiltable handle or grip member mounted on the side of the camera, which handle could also serve as a mini-pod. The tiltable handle and telescoping arm are shown in U.S. Pat. No. 4,560,261 (FIG. 7), U.S. Pat. No. 4,575,206 (FIGS. 1, 2, & 10), and U.S. Pat. No. 4,530,580.

While this camera and accessory arm permitted self portraits, it bad many disadvantages. Initially, the accessory arm and camera were designed to be used together. Thus, the accessory telescoping arm had a mounting stud which could not be positioned in a variety of positions. This defect was overcome by having the telescoping arm secured to the bottom of the tiltable handle on the camera. However, as can be seen from FIGS. 2 and 3 of U.S. Pat. No. 4,530,580 if the telescoping arm was coupled directly to the camera the desired position of the camera may not be obtained as the camera can only be angled about the axis of the mounting stud.

In addition, if the use of a mirror was desired, the telescoping arm could only be used with the disc-7 camera. Thus, the disc-7 camera was provided with a mirror, whereas the telescoping arm was not. In the regard, it should be noted that it was almost essential to have a mirror on the camera, as the camera was not provided with a view screen as are today's digital cameras.

Another disadvantage of the telescoping arm of the Minolta design was that it lacked detents or similar locking means to prevent unintentional retraction. Thus, if the telescoping arm were held in a vertical position with the camera on top, it was possible for the weight of the camera to cause the arm to telescope to its closed position.

While it is suggested at col. 2, lines 48-50 of U.S. Pat. No. 4,530,580 that the grip of the telescopic extender could be supported by a tripod, it would not have been possible to mount the camera above the tripod, but only to one side of the tripod. Thus, the disc-7 did not come with a tripod in its kit, as there would be no advantage to such a mounting.

It is very difficult for a person in a wheelchair to set a camera on a tripod and move to a preferred position in the photo(s) before the self timer activates. Even when used in this way with a remote control, it would normally require the person in the wheelchair to return to the location of the tripod to review the photos.

Sometimes the user of a camera would like to take pictures underwater, however, even though most waterproof cameras are provided with a tripod mount, it is difficult to set-up a tripod underwater. In addition, the user of a camera may want to explore by camera hard-to-reach or unsafe areas.

OBJECTS AND SUMMARY OF THE INVENTION

It is an object of the present invention to provide an apparatus whereby the user of a camera can readily take an image of him or her self at any time alone or as part of a group, can readily take pictures when the view may be blocked as by a crowd, can readily be used by people confined to wheelchairs or the like, and can readily be used underwater by using the camera self-timer function or a camera remote control function, which camera overcomes the disadvantages of know prior art devices.

More particularly it is an object of the present invention to provide an apparatus for supporting a camera by hand, the apparatus including a base assembly which may be secured to a camera in various positions, a handgrip, and an elongated support which extends between the handgrip and the base assembly whereby the user of the camera may secure a camera to the base assembly and, either by setting the self-timer or by using a remote control device, and while holding the handgrip, position the camera a distance away, which may be greater than arms length, to capture a still or moving image of the user.

Another object of the present invention is to provide an apparatus for supporting a camera by hand, the apparatus including a base, a handgrip, and an telescopic elongated support extending between the base and the handgrip, which support is provided with detents or similar means to prevent unintentional retraction; whereby, when a camera is supported by the base, and after the self-timer function is initiated, or by using a remote control device, raise the camera above the head to take a picture not visible at eye level or within arms' reach, as for example, when at a parade, concert or sporting event where the view is obstructed by a crowd.

Yet another object of the present invention is to provide a hand held elongated camera support which may be used to explore by camera hard-to-reach or unsafe areas by using the self-timer function of the camera or a camera remote control device.

It is a further object of the present invention to provide an apparatus of the type set forth above wherein the elongated support is an extensible support, such as a telescoping support, which support may be telescoped between retracted and extended positions.

It is yet another object of the present invention to provide an apparatus of the type set forth above wherein a remote control device can be associated with the apparatus.

It is an additional object of the present invention to provide an extensible support with a motorized function so that a camera carried by the support can be moved towards and away from the user to, in effect, provide the camera with a zoom function.

Another object of the present invention is to provide a device for taking a picture when the view is blocked by a crowd; for example, a parade when a crowd is between the user and the parade.

People confined to wheelchairs and the like also find the apparatus of the present invention useful because with this apparatus the wheelchair user can set the self-timer of a camera, suitably position the camera away from the user at a distance which may be greater than arms length, take a picture, and then almost instantly review the photo by bring the camera back towards the eye and reshooting if necessary without moving the wheelchair.

As the elongated support of the apparatus may be made of a non-corrosive material, such as plastic, the present invention may also be used underwater. In this regard, most digital underwater cameras are provided with a tripod stud receiver for use with a tripod when out of the water. An underwater video camera may be mounted on the apparatus of this invention, the video camera then being lowered into a swimming pool for leak detection. It may also be used for underwater self-portraits in a swimming pool or other body of water. A standard tripod requires a steady support surface which is not available underwater.

The foregoing objects and other objects and advantages of this invention will be more fully understood after a consideration of the following detailed description taken in conjunction with the accompanying drawings. As can be seen from the following drawings, the apparatus of this invention includes a base assembly which may be secured to a camera, a handgrip, and an elongated support. The base assembly in the illustrated embodiments affixes to the bottom tripod mount on a camera, which camera may be provided with a self-timer, remote shutter release, or a remote control device. The user of the camera and the apparatus of the present invention will hold the handgrip and aim the camera with the lens facing himself. This allows self-portraits with an extended reach eliminating distortion, discomfort and overexposure due to the close proximity of the flash. The apparatus of this invention has the main feature of the "capture yourself" function, but the apparatus is multi-functional and may be used like a regular monopod, or in some embodiments, as a regular tripod. In addition, the apparatus may be used for taking pictures of scenes which would otherwise be obstructed. While many camcorders come with a self-timer function there are others that do not. While some camcorders come with a remote control device, others do not. Therefore, when using a camcorder without a remote control device, the user will initially hold the camera on the apparatus of this invention with one hand and depress the record button with the other hand. He (or she) will then suitably position the apparatus for recording his or her image, and then bring the camcorder back to the initial position so he or she can stop recording. It is a simple task to eliminate unwanted images during playback or edit mode on the camcorder or on a computer during an optional editing process.

DETAILED DESCRIPTION

Figure 1:
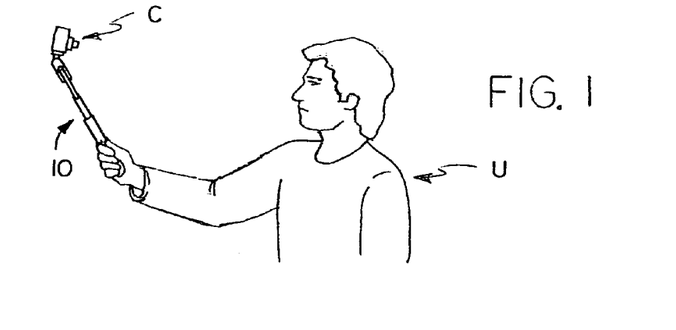
FIG. 1 shows how an embodiment of the apparatus of this invention may be used so that the user of the apparatus, while holding a handgrip of the apparatus, may position the camera a distance away greater than arm's length to capture a still or moving image of himself.
Figure 2:
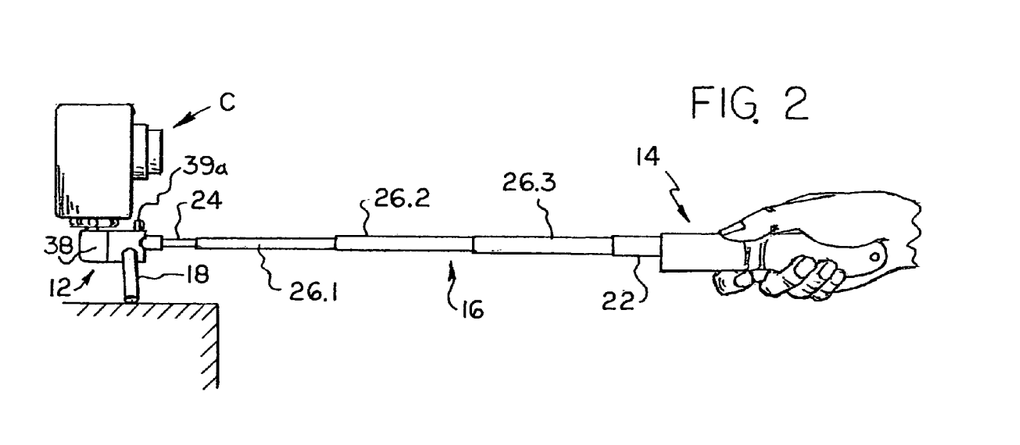
FIG. 2 is a side view of an embodiment showing the apparatus in a fully extended position and with short tripod legs disposed so that the apparatus may be partially supported upon a table top.
Figure 10:
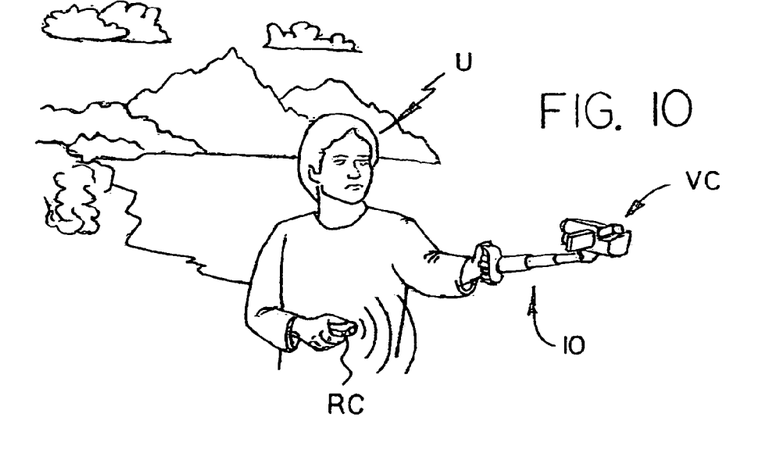
FIG. 10 is a view of a further embodiment with a digital camcorder being mounted thereon, the user holding a separate remote control device.
Figure 12:
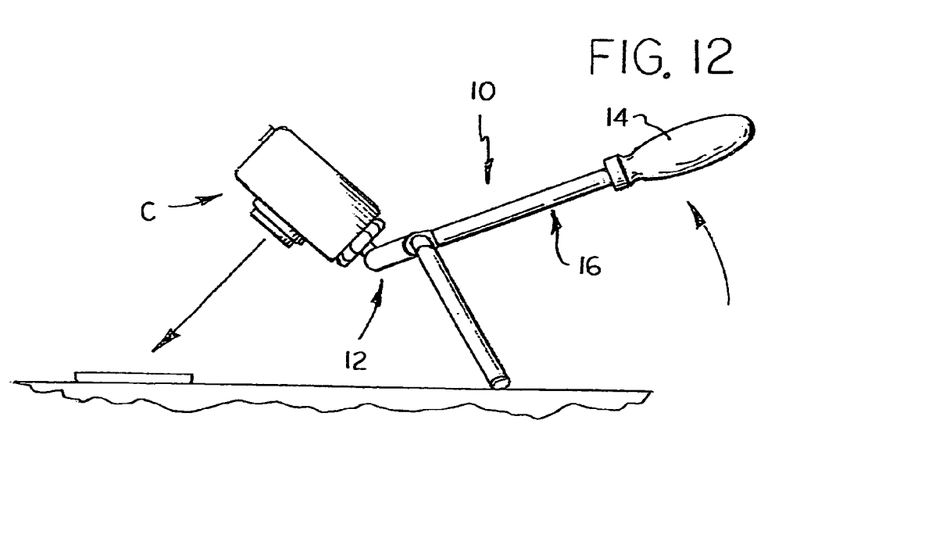
FIG. 12 is a view of a still further embodiment showing how a device of this invention may be used for facilitating close-up pictures.

A camera is shown in FIGS. 1, 2, and 12, and a video camera is shown in FIG. 10. While the term "camera" is frequently used in this application, it should be appreciated that the term "camera" should be interpreted to include anything capable of capturing an image, such as a film camera, a digital camera (or camcorder), a motion picture camera, a video camera, a picture phone, and/or a video phone. It should also be noted that many of these devices, while designed primarily for either video or still, can be used for the other purpose. In the following description common reference numerals will be applied to common parts in the various embodiments.

It is a particular feature of this invention that the apparatus of this invention may be used for self portraits and the like as shown in FIG. 1. Thus, the camera support of this invention is illustrated generally at 10, the camera at "C", and the user at "U". However, this apparatus has other uses, as for example taking pictures of scenes which may be obstructed, and by people exploring hard-to-reach or unsafe areas.

Figure 2A:
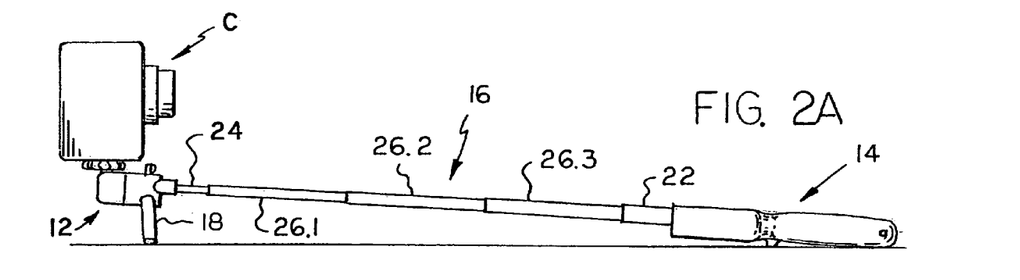
FIG. 2A is a side view of the apparatus shown in FIG. 2, but showing the apparatus mounted as a tripod.
Figures 3, 4, 5:
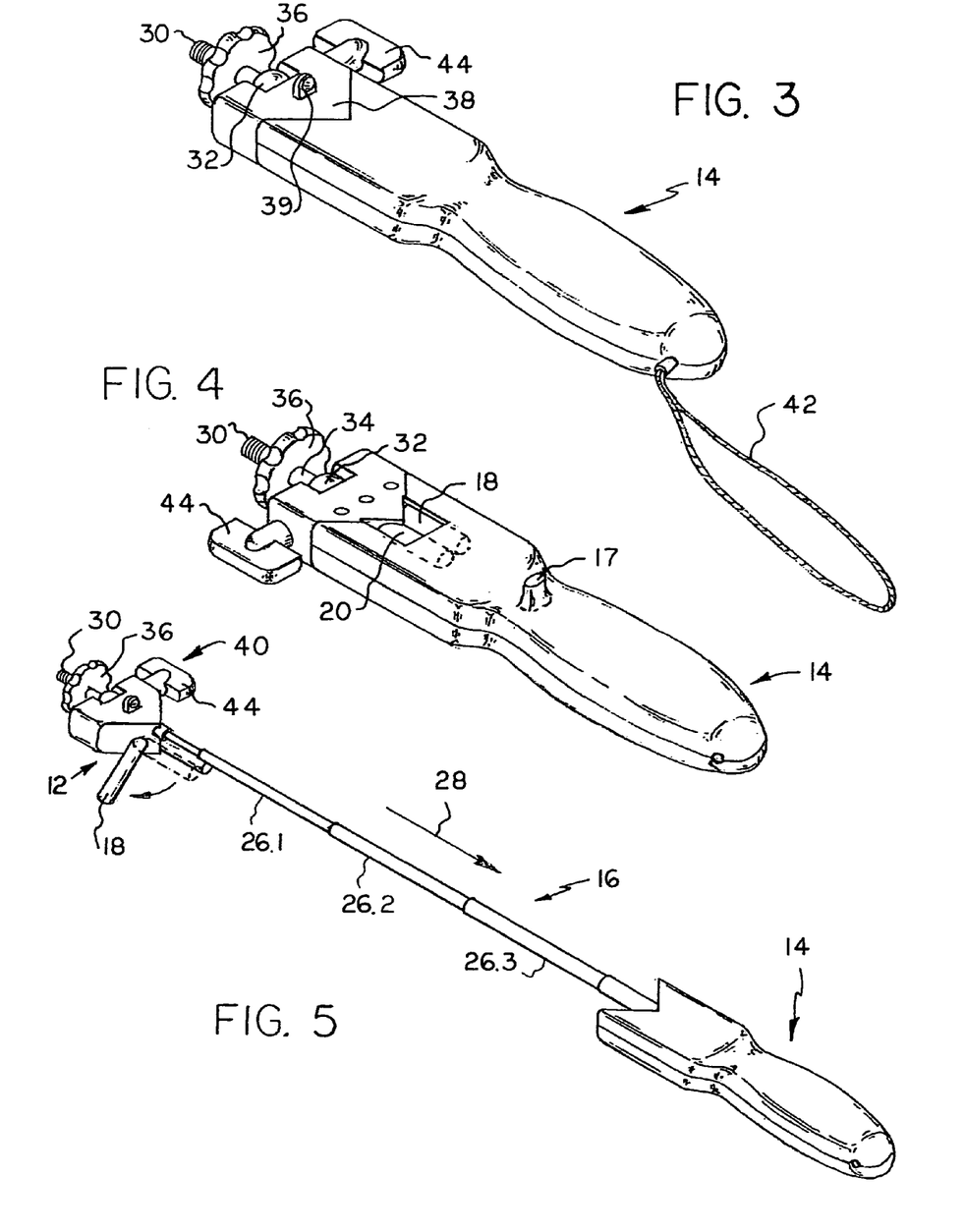
FIG. 3 is a top perspective view of the apparatus shown in FIG. 2 in a fully retracted position with the tripod legs in their stowed position.
FIG. 4 is a bottom perspective view of the apparatus shown in FIG. 2 in a fully retracted position with the tripod legs in their stowed position.
FIG. 5 is a top perspective view of the apparatus shown in FIG. 2 in a fully extended position.

With reference now to FIGS. 2-7, which illustrate an embodiment of this invention, the apparatus 10 includes as its principal components a base assembly indicated generally at 12, a handgrip indicated generally at 14, and an elongated extensible support indicated generally at 16. As shown in FIGS. 2-7 the handgrip 14 has the shape of a rounded rectangle and is provided with a finger grip 17. However, as will become apparent, the handgrip may be in other forms. The handgrip may be made of plastic, aluminum, titanium, or any other suitable material. In addition, it may be coated with rubber or any other suitable material to improve the user's grip. A lanyard 42 may be secured to one end of the handgrip as shown in FIG. 3. The extensible support 16 may be made entirely of a relatively non-corrosive material, such as plastic or aluminum, so it may be used underwater.

The apparatus illustrated in FIGS. 2-7 also includes a pair of tripod legs 18, 20 which, together with the extensible support 16 serve as a tripod. When the apparatus of FIGS. 2-7 is in its retracted position, the tripod legs will be stowed in a pocket (no number) in the handgrip or handle 14. However, when in the extended position the legs 18, 20 may be extended to the tripod position as shown in FIGS. 2, 2A, and 5.

In the embodiments in FIGS. 2-7, the elongated support 16 is of a telescoping construction. To this end, as shown in FIGS. 2, 2A, and 5, the elongated support includes a first large diameter hollow cylindrical segment 22 which is carried by the handgrip 14, and a small diameter cylindrical segment 24 carried by the base assembly 12, and one or more intermediate cylindrical segments 26, three such segments 26.1, 26.2 and 26.3 being illustrated. When the handgrip 14 is moved away from the base assembly 12 in the direction of the arrow 28, the segments will be telescoped to their extended position as illustrated. However, if they were moved in the opposite direction the elongated support 16 would be moved into its retracted position, the apparatus having the appearance as shown in FIGS. 3 and 4. When the elongated support 16 is in an extended position, the embodiment of FIGS. 2-7 may be used as a tripod as shown in FIG. 2A. Alternatively the legs can be used to stabilize the camera when the handgrip is grasped as shown in FIG. 2.

The base assembly 12 includes a threaded stud 30 carried by a ball 32. The ball 32 is part of an integral assembly which also includes a cylindrical portion 34 and a circular turning plate 36. The camera is typically provided with a tripod mount which receives the stud 30, and it is possible to securely mount the camera by turning the plate 36 until it tightly bears against the bottom of the camera tripod mount. The base assembly 12 further includes a body 38 provided with a ball seat (no number) for closely receiving the ball, and permitting its movement between various positions such as those shown in FIGS. 2 and 3. While a tripod mount is illustrated, it is possible to use other devices to secure the camera to the base assembly. Thus, if the camera is a picture phone, a special adaptor may be required. Other devices may also be provided with special adapters.

A small convex mirror 39, which is about the size of the head of a thumb tack may be carried by an abutment 39a on the body 38. This will permit the user to have a view of himself when the apparatus is in a variety of positions, for example the FIG. 2 position.

Means are provided for locking the ball 32 in a desired position within the body 38. To this end, the locking means, which is indicated generally at 40, includes a winged screw 44 which is received by a threaded portion of the body 38, the screw bearing against the ball when the parts are tightened to hold the threaded stud assembly 30-36 in its desired position.

Figure 6:
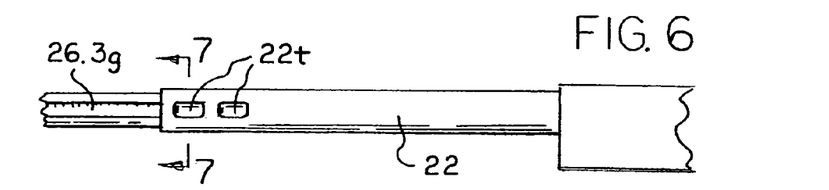
FIG. 6 is an enlarged detail view of the apparatus shown in FIG. 2.
Figure 7:
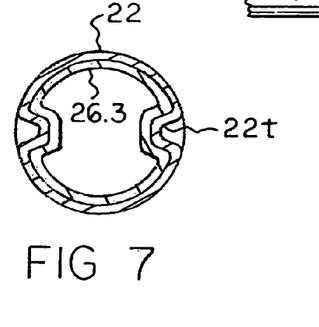
FIG. 7 is a view taken generally along the line 7-7 in FIG. 6.

As can be seen from FIGS. 6-7, the telescoping sections 22, 26.3 are provided with a tongue and groove arrangement to prevent rotation. Thus, section 22 is provided with tongue 22t, and section 26.3 is provided with groove 26.3g. Similarly, the other end of 26.3 may be provided with a tongue to cooperate with a groove in part 26.2. While a short tongue 22t and a long groove 26.3g are illustrated, the parts may have a short groove and a long tongue which would be in the form of a longitudinally extending rib. This arrangement will be repeated as necessary to insure that the parts do not rotate about their longitudinal axes. Other forms of telescoping rods may be used. For example, the telescoping rods could be square shaped, triangular, octagonal or any other shape that will not rotate. Alternatively, rods can be used that partially rotate until locked by means of a clockwise/counterclockwise twisting lock/unlock action similar to some extensible tripod legs and walking sticks.

Figure 8:
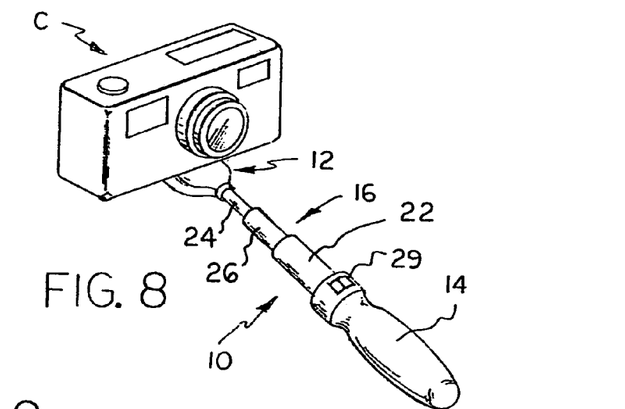
FIG. 8 is a view of an alternative apparatus which may be powered to move a camera mounted on the apparatus towards and away from the user, the apparatus being shown in a partially retracted position.
Figure 9:
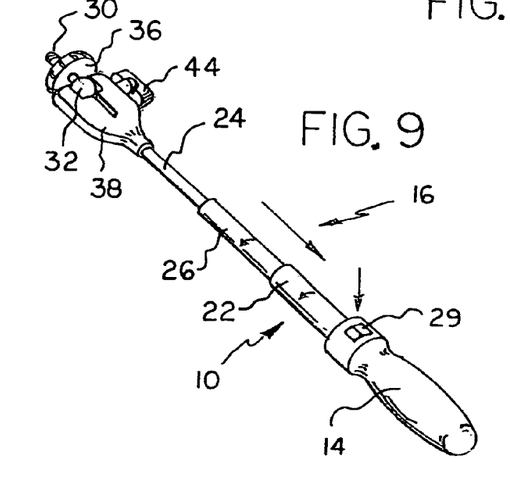
FIG. 9 is a view of the apparatus shown in FIG. 8 without the camera, and in a fully extended position.

A second embodiment of this invention is illustrated in FIGS. 8-9. In this embodiment there are no tripod legs, and the elongated support 16 may be motorized to cause it to be moved between retracted and extended positions. A camera "C" may be mounted on the base assembly 12. By simply using the rocker switch 29 to operate the motorized extensible and retractable support, the camera can be moved towards and away from the user. This is particularly useful when using camcorders, such as the one illustrated in FIG. 10 at "VC", to give a zoom effect. Thus, the user "U" of the camera, can point it at himself, and by working the rocker switch 29 zoom in and out. If the camera is provided with a swivel LCD, the motorized function can also be used to crop the image before it is taken.

Motorized mechanisms for moving parts towards and away from each other are well known and are therefore not illustrated. One example is the mechanisms used for zoom lenses in cameras. In this embodiment the elongated support 16 includes a first hollow cylindrical segment 22 of larger diameter which is secured to the grip, a second intermediate cylindrical segment 26, and a third cylindrical segment 24 of smallest diameter, which third support is secured to the base assembly 12. While three cylindrical segments are illustrated, the telescoping support can have any number of segments which will be capable of supporting the camera. The handle shown in this embodiment is similar to a screw driver handle. While not shown, it may be covered with a rubbery grip.

The base assembly 12 shown in FIGS. 8 and 9 differs from the base assembly shown in previous figures. Thus, the body 38 is bifurcated, and the screw, which is connected to the nut, is received in a threaded aperture in the bifurcated portion remote from the nut. When tightened, the nut will bear on the immediate adjacent bifurcated portion to cause the bifurcated portions to hold the ball in the selected position.

With further reference to the third embodiment shown in FIG. 10, this embodiment is provided with a D-shaped handgrip. The handgrip is in the shape of a D-shaped handle to provide greater support for the user, which type of handle will offer better support if the camera/camcorder is on the heavy side, and may also prevent horizontal slippage. If the apparatus of FIG. 10 does not have a motorized function, and if the video camera is provided with a remote control device "RC", the user may use the remote control device to achieve a zoom function. In this regard, it should be noted that the camera illustrated is provided with a swivel LCD view screen, which may be positioned so the user can see it.

Figure 11:
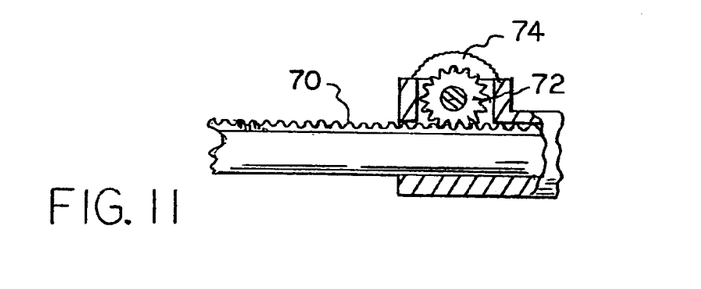
FIG. 11 is a partial view of yet another embodiment showing an alternative manner for extending and retracting the device.

While an extensible support has been described which is either motorized or telescoping, other forms of extensible supports may be utilized. For example, as shown in FIG. 11, a rack 70 and pinion 72 design may be employed, the pinion being operated by a knurled wheel 74. This design may be particularly suitable for a child's version. In addition, the elongated support can be fashioned using components that snap or screw together to increase the length of the device.

FIG. 12 illustrates how the apparatus of this invention, when provided with tripod legs, may be used to facilitate the taking of closeup pictures.

Figures 13, 14, 14A, 15:
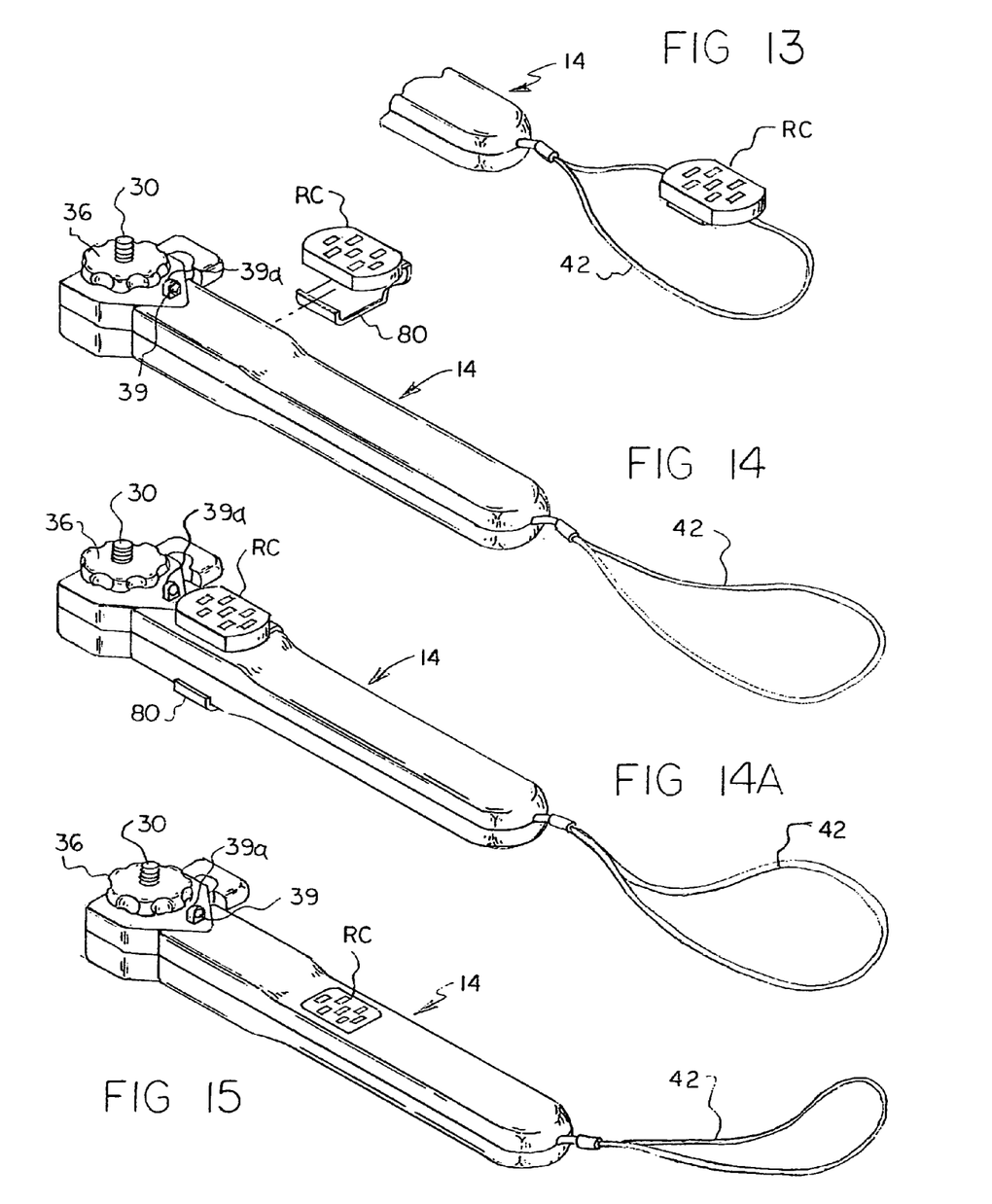
FIG. 13 is a view of the apparatus shown in FIG. 3, but with a remote control device associated with the apparatus, the remote control device being carried by a lanyard.
FIGS. 14 and 14A is a view of the apparatus shown in FIGS. 2-7 and further illustrates a remote control device carried by a C-shaped clip which can be snapped onto the handgrip.
FIG. 15 is a view of an apparatus similar to that shown in FIGS. 2-7, but wherein a remote control device is integrated into the handgrip.

As many cameras and most digital recorders come with remote control devices, it may be desirable that a remote control device be associated with the apparatus of this invention. Three differing variations are shown in FIGS. 13-15. In FIG. 13 a remote control device RC is associated with the lanyard 42. The remote control device in this embodiment is of two parts which clip together about the lanyard. In the FIG. 14-14A embodiment the remote control device is incorporated into a C-shaped clip 80 which may be clipped about the handle 14. In the FIG. 15 embodiment the remote control device is integrated into the handle. In all of these embodiments the remote control device may have some pre-programmed codes for popular brand cameras and camcorders. The remote control may also have a learning function. This will allow the user of the remote control of this apparatus to aim an existing camera remote control at it, the remote control device of this apparatus then memorizing the infra red codes (or any other communication codes) for the existing camera remote control device. In this way the user of the apparatus of this invention will be able to hold a camera and activate the zoom, shutter release and playback from the remote control associated with the apparatus. It is also possible to have a website that will allow users to download operational codes. The remote control will be powered by batteries, typically button cell batteries. While the apparatus of this invention may be provided with a mirror 39, it should be noted that many new digital camera and most camcorders already provide a swivel LCD to allow the user to view the image when the camera lens faces the user. This is particularly useful when the zoom function is utilized.

Figure 16:
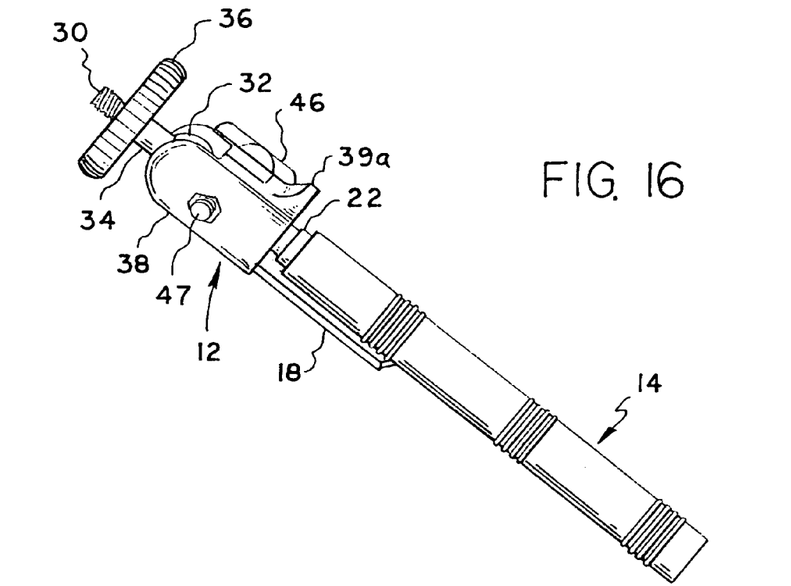
FIG. 16 is a view of a slimmer version.

The embodiment shown in FIG. 16 is a slim design. Functionally it is the equivalent of that shown in FIG. 2, but has a smaller handle 14. In addition, it may have small tripod legs 18 and 20 (one of which is not shown). This also differs from the design of FIGS. 2-7 in that the body 38 which receives the ball 32 is split, the ball 32 being clamped within the split body 38 by a winged nut 46 which received a bolt 47 having a hexagonal head which is received in a suitable recess on the body 38.

Figures 17, 18:
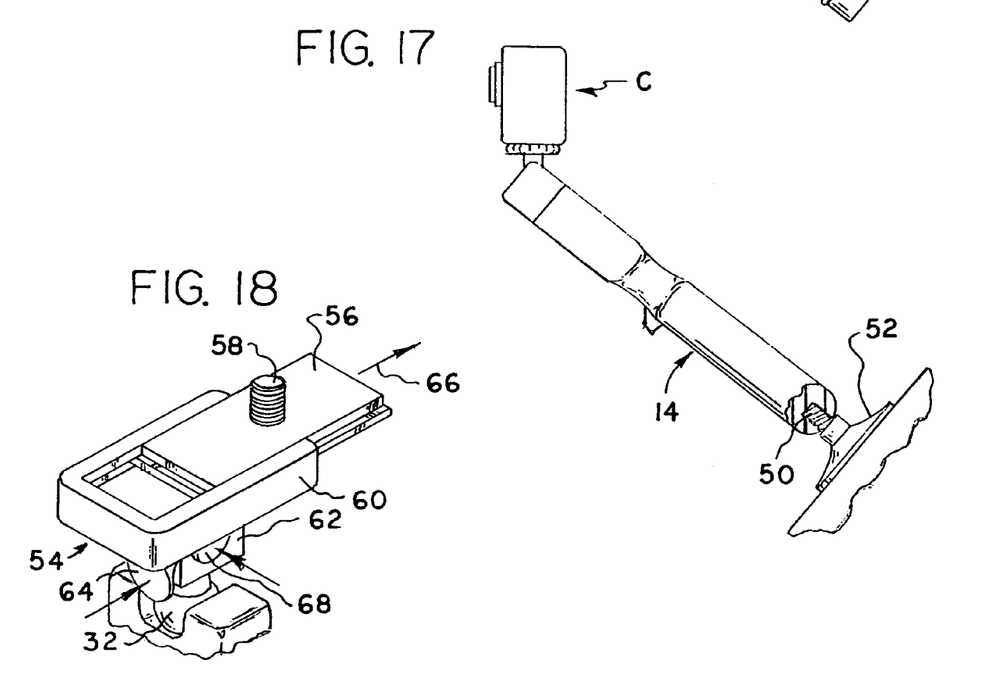
FIG. 17 is a view of the apparatus secured to a vehicle by an attachment which slips over the handgrip and which has a suction cup for securing the assembly to a relatively flat, smooth surface of the vehicle.
FIG. 18 shows a base assembly provided with a slidable quick release plate provided with a threaded stud, and a base which receives the slidable quick release plate.
Figure 20:
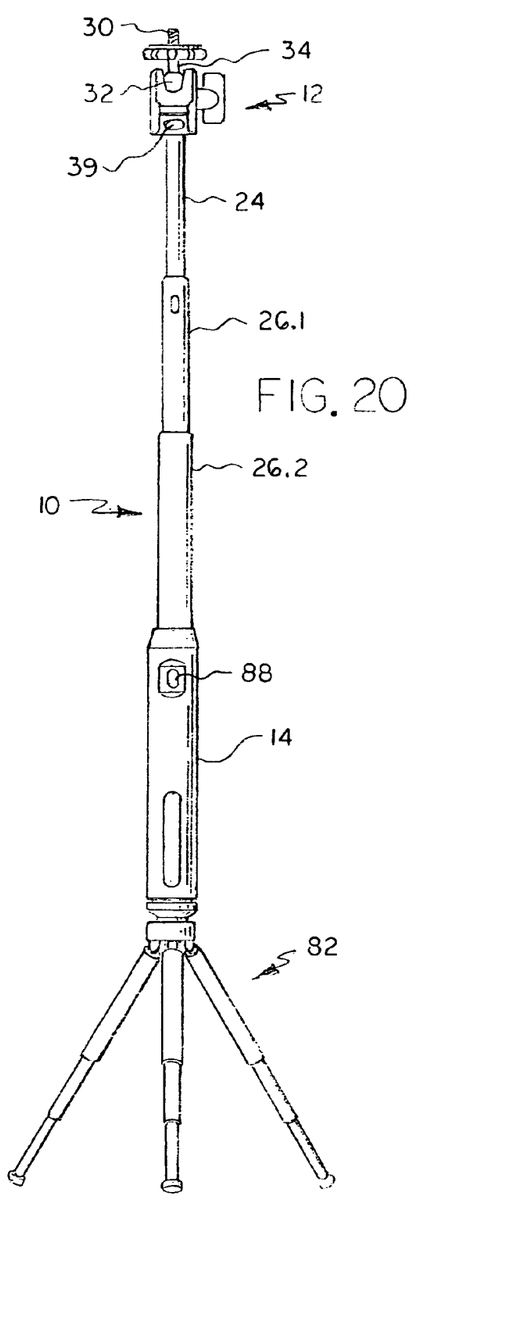
FIG. 20 shows the embodiment of FIG. 19 in a fully extended position, and mounted on a tripod, the pocket clip having been removed.
Figures 21, 22, 23:
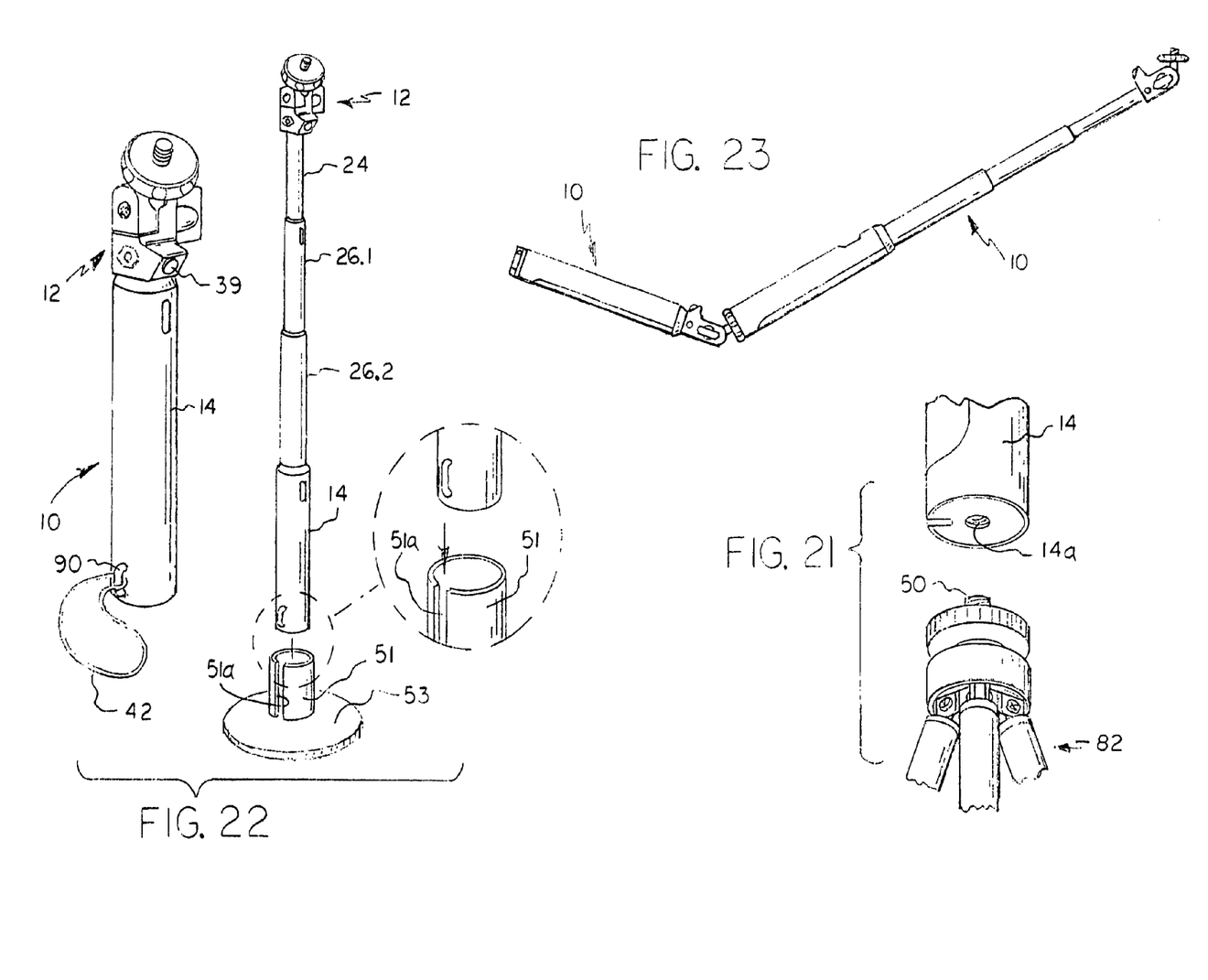
FIG. 21 shows the bottom of the embodiment of FIG. 19 after the pocket clip has been removed, and showing the top of the tripod.
FIG. 22 shows an embodiment without the removable pocket clip, but showing a wrist strap, and a mounting sleeve.
FIG. 23 shows how two camera supports of this invention may be secured to each other to extend the reach of the apparatus.

It may be desirable on occasion to mount the apparatus of this invention on another mounting apparatus, platform, or support. Thus, as shown in FIG. 17, the handgrip is provided with a threaded aperture which can receive a stud 50 of a mounting apparatus or platform. As shown in FIG. 17, the stud is carried by a mounting apparatus including a suction cup 52 which may be secured to a smooth surface, for example a surface of a vehicle. Alternatively, the threaded aperture may receive the stud of a conventional tripod, as shown in FIGS. 20 and 21, thus permitting the camera to be in a higher position than would be possible with the conventional tripod. It is also possible to secure two camera supports of this invention together to provide for a further extension than is possible with a single camera support 10 as shown in FIG. 23. While the suction cup 52 is shown being screwed into the base of the handle, the mounting apparatus could be carried by a sleeve 51 that could be slid over the handle. If a sleeve is used, it may be provided with a suitable slot 51a so a lanyard 42 or writs strap, hiking clip or the equivalent can pass through. Instead of a suction cup 52, any other form of mounting apparatus or platform may be used, such as for example the round disk 53 shown in FIG. 22.

In FIG. 18 a quick release camera mount mounting assembly 54 is illustrated. The assembly includes a mounting plate 56 provided with a stud 58 similar to the stud 30, which stud may be received by the tripod mount of a camera. While not shown, the stud is rotatable in the plate 56, and a coin or the like may be used to rotate the stud to secure the plate to the camera. The plate 56 is in turn received by a slotted base 60 carried by a mount 62 on a ball 32. When the plate is in an assembly position, where it is all the way to the left in FIG. 18, it will be held in position by a latch 64. In order to release the plate and to slide it in the direction of the arrow 66, it will be necessary to press in opposed detents 68 (only one of which is shown), and to then press in on the latch 64 to release the plate.

As can be seen from the above, a person using the present invention will attach it to the bottom of a camera, and is then able to take a self-portrait, or be included in moving video footage at gatherings, or may take pictures of obstructed views. The camera support of the present invention collapses for easy transport. It is lightweight, handy, with comfort support handle. The handgrip may also be used as a footing when used as a monopod or tripod.

Figure 19:
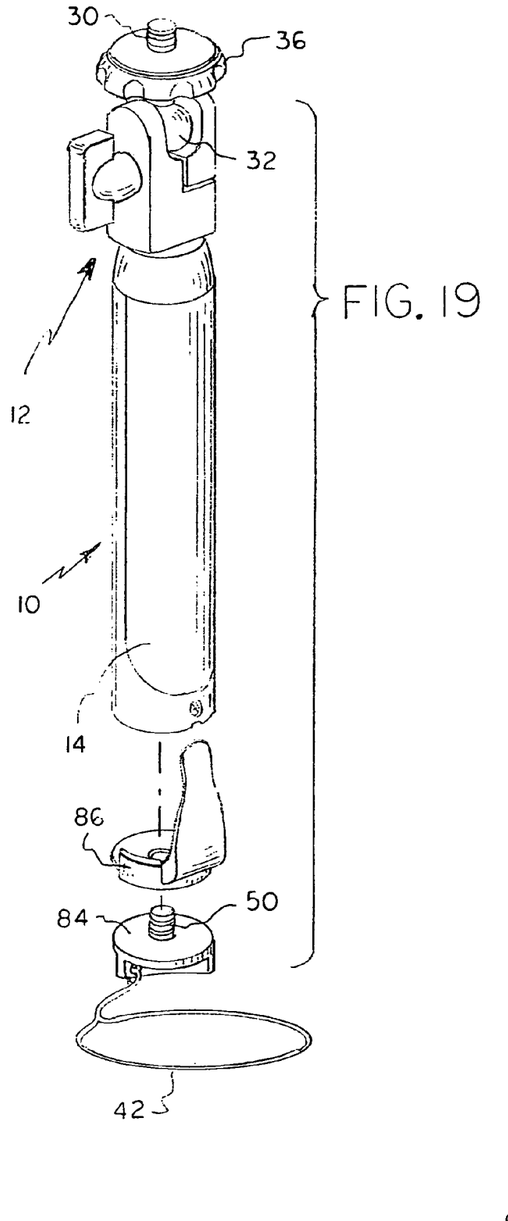
FIG. 19 shows an embodiment of the present invention in a fully retracted position, the embodiment being provided with a removable pocket clip.

With reference now to FIGS. 19-21 commercial form of this invention is illustrated. In this form the apparatus is indicated generally at 10 and includes four telescoping section, the largest diameter section being a hand grip portion 14, there being a small diameter segment 24, and intermediate segments 26.1 and 26.2. The handgrip portion 14 is provided with a threaded aperture 14a which can receive a stud 50 of a mounting apparatus or platform. As previously noted the mounting apparatus may be a tripod, such as for example the small tripod 82 as shown in FIGS. 20 and 21. Normally the aperture 14a will receive the stud 50 of a clip retainer 84 which normally holds a clip 86 in place at the end of the handle portion 14. The clip retainer 84 may also be provided with a small aperture to which a lanyard 42 is secured.

As can also be seen from FIGS. 19 and 20, the small diameter segment is provided with a base assembly indicated generally at 12, which base assembly correspond functionally to the base assemblies set forth above. To this end, the base assembly is provided with a threaded stud 30 carried by a ball 32. As shown in similar designs, the ball 32 is part of an integral assembly which also includes a cylindrical portion 34 and a circular turning plate 36. The camera is typically provided with a tripod mount which receives the stud 30.

In the embodiment shown in FIGS. 19 and 20 the telescoping sections are provided with an internal tongue and groove construction to keep the parts from turning with respect to each other. In addition, there are releasable detents to keep the parts in their extended position. To retract it from the fully extended position it is only necessary to push the button 88, grip both ends and push the rod 24 into the handle 14.

FIG. 22 shows an embodiment 10 without the removable pocket clip, but showing a wrist strap 42 or lanyard secured to a lanyard clip 90 carried by the hand portion 14. Also shown is a mounting sleeve 51 which may be carried by any suitable mounting platform or structure, such as for example the round disk 53. If desired, the embodiment shown in FIG. 22 can be slipped into the sleeve in the manner shown.

Finally, FIG. 23 shows how two camera supports 10 of this invention may be secured to each other to extend the reach of the apparatus. While the left hand apparatus 10 is shown in its retracted position, it should be obvious that it may be extended.

While preferred forms of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. An apparatus for supporting a camera by hand comprising:
   a base assembly which may be secured to a camera;
   a handgrip; and
   an elongated support which extends between the handgrip and the base assembly whereby a user of the apparatus may secure a camera to the base assembly and, while holding the handgrip, position the camera a distance away greater than arms length to capture a still image or moving images;
characterized by the base assembly comprising a mirror so that the user may view himself when the apparatus is in a variety of positions to facilitate self-portraits.

* * * * *